United States Patent
Garner

(10) Patent No.: US 10,400,712 B2
(45) Date of Patent: Sep. 3, 2019

(54) INTELLIGENT PRESSURE MANAGEMENT SYSTEM FOR CRYOGENIC FLUID SYSTEMS

(71) Applicant: Westport Power Inc., Vancouver (CA)

(72) Inventor: Gage D. Garner, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 95 days.

(21) Appl. No.: 15/570,300

(22) PCT Filed: Apr. 29, 2016

(86) PCT No.: PCT/CA2016/050505
§ 371 (c)(1),
(2) Date: Oct. 27, 2017

(87) PCT Pub. No.: WO2016/172803
PCT Pub. Date: Nov. 3, 2016

(65) Prior Publication Data
US 2018/0128210 A1 May 10, 2018

Related U.S. Application Data

(60) Provisional application No. 62/155,438, filed on Apr. 30, 2015.

(51) Int. Cl.
*F02M 21/02* (2006.01)
*F17C 9/02* (2006.01)
(Continued)

(52) U.S. Cl.
CPC .... *F02M 21/0215* (2013.01); *F02M 21/0212* (2013.01); *F02M 21/0221* (2013.01);
(Continued)

(58) Field of Classification Search
CPC ........... F02M 21/0215; F02M 21/0239; F02M 21/0212; F02M 21/0221; F02M 21/06;
(Continued)

(56) References Cited

U.S. PATENT DOCUMENTS 5,211,021 A * 5/1993 Pierson ..................... F17C 5/02
141/11
5,787,940 A * 8/1998 Bonn ...................... F04B 19/06
141/18
(Continued)

FOREIGN PATENT DOCUMENTS

WO WO-2007068081 A1 * 6/2007 ............. F02M 21/06
WO 2010/096903 A1 9/2010
(Continued)

OTHER PUBLICATIONS

Extended European Search Report for corresponding EPO Application, dated Oct. 5, 2018.
(Continued)

*Primary Examiner* — Nicolas A Arnett
(74) *Attorney, Agent, or Firm* — Carie C. Mager

(57) ABSTRACT

An intelligent pressure management system that controls the pressure inside a cryogenic tank between variable target vapor pressure values and/or ranges that are set as a function of system operating conditions, by actuating an actively controllable valve disposed on a gaseous fluid vapor conduit; and in some embodiments, additionally by actuating an actively controllable valve on a liquefied gaseous fluid conduit, based on a signal received from a pressure sensor that measures the pressure inside the pressurized tank. The variable target vapor pressure values and/or ranges are determined as a function of at least two system operating conditions which can include the vapor volume in the storage space; the fluid flow demanded by the use device;
(Continued)

and a measured temperature parameter that correlates to the temperature of the fluid exiting a heater.

20 Claims, 6 Drawing Sheets

(51) Int. Cl.
*F17C 13/02* (2006.01)
*F02M 21/06* (2006.01)
*F17C 7/04* (2006.01)

(52) U.S. Cl.
CPC ........ *F02M 21/0239* (2013.01); *F02M 21/06* (2013.01); *F17C 7/04* (2013.01); *F17C 9/02* (2013.01); *F17C 13/025* (2013.01); *F17C 2201/035* (2013.01); *F17C 2201/056* (2013.01); *F17C 2205/0326* (2013.01); *F17C 2205/0332* (2013.01); *F17C 2205/0335* (2013.01); *F17C 2221/033* (2013.01); *F17C 2223/0161* (2013.01); *F17C 2223/033* (2013.01); *F17C 2223/043* (2013.01); *F17C 2223/046* (2013.01); *F17C 2225/0123* (2013.01); *F17C 2227/0316* (2013.01); *F17C 2227/0323* (2013.01); *F17C 2227/0393* (2013.01); *F17C 2250/032* (2013.01); *F17C 2250/043* (2013.01); *F17C 2250/0439* (2013.01); *F17C 2260/021* (2013.01); *F17C 2265/066* (2013.01); *F17C 2270/0168* (2013.01); *Y02T 10/32* (2013.01)

(58) Field of Classification Search
CPC .. F17C 7/04; F17C 9/02; F17C 13/025; F17C 2227/0393; F17C 2227/0323; F17C 2227/0316; F17C 2225/0123; F17C 2225/0161; F17C 2225/046; F17C 2201/056; F17C 2201/035; F17C 2205/0332; F17C 2205/0326; F17C 2205/0335; F17C 2223/043; F17C 2223/033; F17C 2221/033; F17C 2260/021; F17C 2265/066; F17C 2270/0168; F17C 2250/0439; F17C 2250/032; F17C 2250/043; Y02T 10/32
See application file for complete search history.

(56) References Cited

U.S. PATENT DOCUMENTS

| 6,058,713 | A | 5/2000 | Bowen et al. | |
|---|---|---|---|---|
| 8,291,944 | B2* | 10/2012 | Allidieres | F17C 5/007 137/565.16 |
| 8,695,357 | B2* | 4/2014 | Brook | F02M 21/06 62/49.1 |
| 9,279,541 | B2* | 3/2016 | Cohen | F17C 5/06 |
| 9,771,886 | B2* | 9/2017 | Garner | F17C 5/007 |
| 9,897,055 | B2* | 2/2018 | Batenburg | F17C 9/02 |
| 2002/0157402 | A1* | 10/2002 | Drube | F17C 5/007 62/50.1 |
| 2008/0226463 | A1* | 9/2008 | Batenburg | F02M 21/06 417/32 |
| 2011/0314839 | A1* | 12/2011 | Brook | F02M 21/06 62/49.1 |
| 2013/0014517 | A1* | 1/2013 | Diederichs | F25D 19/00 62/6 |
| 2013/0220429 | A1* | 8/2013 | Batenburg | F02M 21/06 137/2 |
| 2014/0299101 | A1* | 10/2014 | Melanson | F17C 5/06 123/445 |
| 2014/0311622 | A1 | 10/2014 | Cohen | |
| 2015/0362128 | A1* | 12/2015 | Sanglan | F17C 7/04 62/50.2 |
| 2016/0017835 | A1* | 1/2016 | Garner | F17C 5/007 123/458 |
| 2016/0290297 | A1* | 10/2016 | Batenburg | F02M 65/00 |

FOREIGN PATENT DOCUMENTS

| WO | 2014078962 A1 | 9/2010 |
|---|---|---|
| WO | 2014091061 A1 | 6/2014 |

OTHER PUBLICATIONS

International Search Report and Written Opinion of the International Searching Authority, dated Jun. 16, 2016.

\* cited by examiner

INTELLIGENT PRESSURE MANAGEMENT SYSTEM FOR CRYOGENIC FLUID SYSTEMS

FIELD OF THE INVENTION

The present disclosure relates generally to an electronically controlled vapor pressure management system for gaseous fluid supply systems and more particularly to managing cryogenic fluid vapor pressure especially useful in supplying fluid to a use device such as an engine system operating at least in part using gaseous fuel.

BACKGROUND OF THE INVENTION

To reduce the storage volume, gaseous fluids can be stored in liquefied form at cryogenic temperatures when employed for example as fuel for internal combustion engines. A gaseous fluid including a gaseous fuel is defined as any fluid that is in a gas state at standard temperature and pressure which is defined herein as 1 atmosphere and between 20 and 25 degrees Celsius. Gaseous fuel is normally stored near its boiling point in a storage vessel. For example, for methane at a storage pressure of about 1 atmosphere it can be stored in liquefied form at a temperature of about −161 degrees Celsius. Natural gas is a mixture of gasses with methane typically comprising the largest fraction; storage temperature can vary, but is normally close to that of methane. From the storage vessel, the gaseous fluid can be supplied in either a liquefied or a vapor state to a heater where the temperature of the gaseous fluid is increased for delivery at a desired pressure and temperature for use for example for injecting into an engine.

In known systems, a heater vaporizes liquefied gaseous fuel when the gaseous fuel is delivered to an engine. The heater can be a heat exchanger that transfers heat energy from warmer engine coolant to the colder liquefied gas. After vaporization in a vaporizer, a fuel injection system receives vaporized gaseous fuel and introduces it, either directly or indirectly, to one or more combustion chambers in an engine. As used herein, vaporizing refers to at least increasing the enthalpy (that is, temperature) of the gaseous fluid as it passes through the heater, and depending upon the pressure and the temperature of the gaseous fluid it can also refer to changing the state of the gaseous fluid from a liquefied or supercritical state to the gas state. While liquefied natural gas (LNG) is an exemplary liquefied gaseous fluid, other gaseous fluids are equally applicable to the technique described herein.

It is important to control the vapor pressure of the gaseous fluid within its cryogenic supply tank as well as the vapor pressure and temperature at which it is supplied to certain use device systems including gaseous fueled engine systems. The pressure and temperature must be above predetermined minimum values such that gaseous fluid can be delivered at a needed pressure to a use device while protecting components from excessively cold temperatures that could cause component failure. Additionally it is important to keep pressures within the tank below pressures that would cause venting to atmosphere and/or in more extreme cases failure of the tank. This pressure and temperature control is managed through a fluid supply circuit in fluid communication with the tank such that the pressure and temperature is maintained between predetermined system thresholds. Fluid can be delivered from the tank to a vaporizer from either a conduit generally in fluid communication with the liquefied portion or a conduit generally in fluid communication with the vapor portion of the tank, or a combination thereof, through actively controlled valves on the two separate fluid delivery lines.

Prior art systems used for metering gaseous fuel to an engine are typically mechanical in nature using what is termed in the industry as an "economizer" which is a mechanical valve with a fixed pressure setting. When the tank pressure is higher than a set pressure, the economizer sends vapor from the tank to the vaporizer and when tank pressure is below the set pressure the economizer valve closes and liquid is delivered to the vaporizer. Cryogenic fuel tanks typically have high tank pressure after filling up the tank at refueling or after sitting for multiple days without use. The economizer uses tank pressure when tank pressure is high to prevent any vapor being vented out of the tank. However mechanical systems such as ones that employ an economizer valve have no way of reacting to varying use device demands; these systems are designed to blindly consume the vapor from the tank first only when the tank pressure has fallen below a set point, such systems will switch over to liquid fuel delivery.

An electronically controlled pressure management system is described in U.S. Pat. No. 6,058,713 by Bowen et al. which discloses a gaseous fuel control delivery system that delivers fuel from a cryogenic storage tank as a function of engine demand while maintaining a safe pressure within the fuel tank by using a CPU for determining when to open a separate liquid fuel delivery valve or a vapor fuel delivery valve based on engine demand. However while this system takes into account engine demand it has been found that engine operation and fluid handling of the cryogenic fuel are still managed inefficiently by such systems because pressure set points are still fixed; for example, this results in vapor pressure being reduced at times when it would be advantageous to keep vapor pressure higher.

There is a need for an improved control strategy for managing the vapor pressure of fueling systems using cryogenic fluids in the storing and supplying of fuel to gaseous fueled engine systems. A solution is disclosed herein which employs pressure sensors, electronically controlled solenoid valves and a programmed electronic controller to form an intelligent predictive system for managing the pressure, and additionally the temperature in some exemplary systems, of the cryogenic fluid system and for determining fluid delivery modes to a use device such as an engine for an improved efficient system operation. The vapor pressure is used as the pump of the system and maintaining the desired pressure and temperature is central to having a robust, responsive and efficient fluid delivery system while avoiding the problems of prior art systems.

SUMMARY OF THE INVENTION

A pressure management system and method for storing and delivering a fluid to a use device are disclosed. The fluid is in gaseous form at ambient temperature and pressure, but stored in liquefied and vapor form in a cryogenic storage tank for delivery to a use device such as an internal combustion engine. The system includes a tank defining a thermally insulated storage space that can be held at a temperature and pressure at which the fluid can be stored in a liquefied and vapor form; a first conduit through which the fluid can be delivered from the thermally insulated storage space to the use device. It also includes a heater associated with the first conduit and operable to transfer heat to the fluid flowing through the first conduit before it is delivered to the use device; and a second conduit fluidly connecting a vapor space in the thermally insulated storage space with the first conduit. An actively controlled vapor valve is associated with the second conduit operable to stop or allow fluid flow through the second conduit. A pressure sensor measures fluid pressure at a point in the system from which pressure inside the thermally insulated storage space can be determined. A controller connected to receive data inputs from the system and the use device is programmed to send signals to actuate the vapor valve responsive to a determined pressure inside the thermally insulated storage space to maintain a preset pressure target that is variable as a function of predetermined operating conditions, including at least two of vapor volume in the thermally insulated storage space; fluid flow demanded by the use device; and a measured temperature parameter that correlates to a temperature of the fluid exiting the heater. The system may further include a first fluid valve associated with the first conduit operable to stop or allow fluid flow through the first conduit. Additionally, the preset tank vapor pressure target can be a single value and/or a range depending on the determined system operating conditions.

In some exemplary systems, the controller is programed to send signals to actuate both the vapor valve associated with the second conduit and the first fluid valve associated with the first conduit in response to a determined pressure inside the storage space to maintain a preset tank vapor pressure target. In other exemplary systems, the first fluid valve is a check valve which closes flow to the tank through the first conduit when the vapor valve is actuated to an open position. In some exemplary systems, the second conduit fluidly connects to the first conduit downstream of the heater, and in other exemplary systems, the second conduit fluidly connects to the first conduit upstream or within the heater.

The method for controlling pressure inside a cryogenic storage tank and delivering the stored fluid from the cryogen space to a use device is also disclosed. The method includes determining the pressure inside the cryogen space; communicating the pressure to an electronic controller; comparing the determined pressure to a preset tank vapor pressure target that is variable as a function of predetermined operating conditions, including at least two of: vapor volume in the storage space; fluid flow demanded by the use device; and a measured temperature parameter that con-elates to the temperature of the fluid exiting the heater. The controller actuates a vapor valve responsive to a determined differential between the measured pressure and the preset tank vapor pressure target to adjust the vapor pressure in the cryogen space to maintain the preset target. If there is no differential determined between the preset target and the measured pressure, the controller maintains the valve position. If there is a positive differential determined between the preset target and the measured pressure, in that the measured pressure is greater than the preset target, then the controller actuates the vapor valve to an open position or maintains the open position. If there is a negative differential determined between the preset target and the measured pressure, in that the measured pressure is less than the preset target, then the controller actuates the vapor valve to a closed position or maintains the valve in the closed position, and actuates or causes to open the liquid fluid valve to deliver fluid to the heater from the liquid fluid conduit. Depending on the determined system operating conditions, the preset tank vapor pressure target can be a single value and/or a range.

In exemplary systems where the controller can actuate an actively controlled first fluid valve as well as the vapor fluid valve, the pressure in the tank is managed by actuating one or both valves to adjust pressure inside the tank as well as the flow from the tank to the use device. When the pressure in the tank is at a preset vapour pressure target, no valve may be actuated by the controller. Additionally, an optional second fluid valve disposed on the first conduit downstream of the heater may be employed and the controller may be programmed to actuate the second fluid valve to allow or stop fluid flow to the use device.

In some exemplary systems, a controller operates in a predictive mode to adjust the preset pressure target based on at least one of a learned operator use pattern, learned system use pattern, user input, and a geographical location based input that could indicate for example imminent refueling (distance and/or time to refuel), imminent return to home base, imminent parking, imminent shut down, and imminent high load mode requirements. The preset pressure target may be lowered at a predetermined distance and/or time to at least one of system refueling, system return to home base, system parking, and system shut down. The preset pressure target may be raised at a predetermined distance and/or time to a high load requirement of the use device.

BRIEF DESCRIPTION OF THE DRAWINGS

FIG. 3 is a schematic view of a gaseous fluid supply system for a use device having a multi-line heater/vaporizer for both liquefied gaseous fluid conduit and vapor conduit to pass through.

FIGS. 6(e and f) are graphical illustrations showing measured liquid fuel level within the cryogenic tank. The levels are used to determine the variable target tank vapor pressure values and the variable target tank vapor pressure ranges used by the controller to command control valves in order to maintain a desired target pressure value or range in a cryogenic fuel tank.

DETAILED DESCRIPTION

Figure 1:
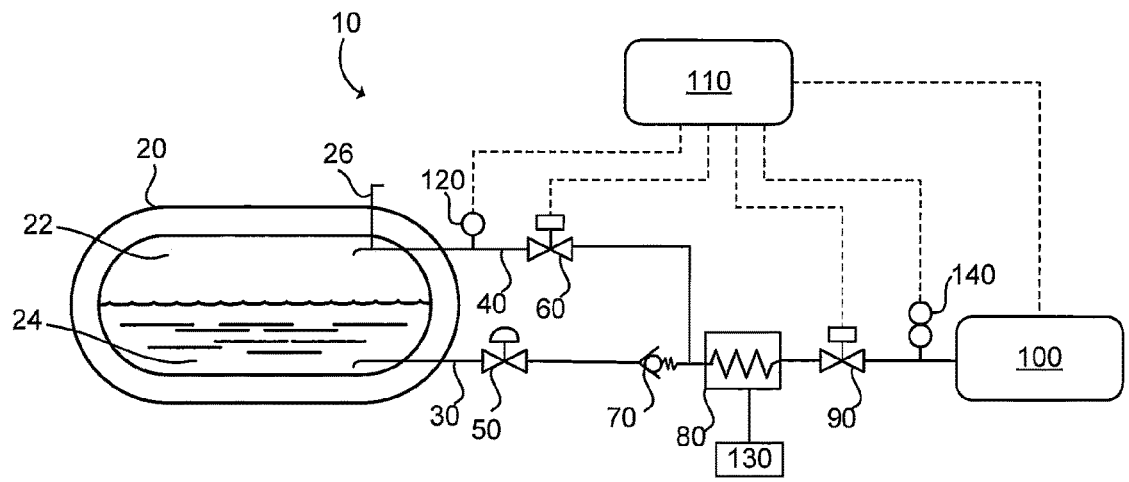
FIG. 1 is a schematic view of a gaseous fluid supply system for a use device having a vapor conduit fluidly connecting to a liquefied gaseous fluid conduit prior to passing through a heater/vaporizer.

An intelligent pressure management system that controls the pressure inside a cryogenic tank between variable target vapor pressure values and/or ranges that are set as a function of system operating conditions is disclosed herein. The system is designed to actuate an actively controllable vapor valve disposed on a gaseous fluid vapor conduit (and in some exemplary systems, additionally actuate an actively controllable valve on a liquefied gaseous fluid conduit) based on a signal received from a pressure sensor that measures the pressure inside the pressurized tank. The variable target vapor pressure values and/or ranges are determined as a function of at least two system operating conditions which can include the vapor volume in the storage space; the fluid flow demanded by the use device; and a measured temperature parameter that correlates to the temperature of the fluid exiting a heater that heats the gaseous fluid before it is delivered to the use device. In one preferred exemplary system a gaseous fluid vapor conduit (also referred to herein as "vapor conduit" and/or "second conduit") is fluidly connected to a liquefied gaseous fluid conduit (also referred to herein as "liquid fluid conduit" and/or "first conduit") which then passes through the heater before delivering a gaseous fluid to a use device. In another preferred exemplary system the liquid fluid conduit and the vapor conduit both pass through the same heater and can then be fluidly connected to a single conduit or remain separate for delivery of gaseous fluid to a use device. In another exemplary system a vapor conduit is fluidly connected to a liquid fluid conduit after the liquid fluid conduit passes through a heater but prior to delivering gaseous fluid to a use device. Alternately a vapor conduit can be connected directly to a use device separate from a liquid fluid conduit.

The heater, sometimes also referred to as a vaporizer, can be for example an electrical heater or a heat-exchanger. In a preferred exemplary system where the vapor conduit fluidly connects with the liquefied gaseous fluid conduit prior to the liquefied gaseous fluid conduit passing through a heater, the heater can be a single-line heat exchanger. In another preferred exemplary system, where both liquid fluid and vapor conduits pass through the same heater, the heater can be a multi-line heat exchanger. A "multi-line" heat exchanger has a number of fluid sources that exchange heat with a transfer fluid of a higher temperature. In a "single-line" heat exchanger only one fluid source exchanges heat with a heat transfer fluid of a higher temperature.

In all exemplary systems described herein, the heater is disposed upstream of an actively controllable valve 90 that regulates the flow through the delivery conduit to the use device. However depending on the system requirements, the heater can be disposed downstream of the actively controllable vapor valve or upstream depending on the type of fluid, the temperature at which the fluid is maintained in the cryogenic tank, and the temperature rating of the valves being used. For example, if an actively controllable vapor valve is disposed upstream of the heater, then a cryogenically rated valve which remains operable at cryogenic temperatures is desirable. This is also the case for any other valves disposed between the cryogenic tank and the heater. Each of the actively controllable valves on the disclosed system can be actuated separately and independently so that the pressure in the tank can be reduced faster or slower, as further described herein. The actively controllable valves on the liquid fluid and vapor conduits can be flow control valves, more specifically electrically actuated valves, for example solenoid valves.

In the illustrated exemplary systems, the tank stores a cryogenic fluid that is supplied to a use device which can be a gaseous fuelled internal combustion engine, diagnostic, medical, processing, ablative, and cutting devices, or any other device that benefits from the intelligent management of gaseous fluids stored in liquefied and vapor form in thermally insulated storage tanks. When the use device is an internal combustion engine a preferred gaseous fluid is natural gas, but it can be any other gaseous fluid that is combustible in an engine, such as propane, ethane, methane, butane, hydrogen, biogas or mixtures thereof.

Cryogenic fluid is stored in the tank within predetermined pressure limits and it can be delivered to a low pressure or a high pressure use device. If the use device is a gaseous fuelled internal combustion engine, an example of a low pressure use device is an engine where the fuel is introduced into the intake air manifold, the intake ports or into the combustion chamber early during the compression cycle. An example of such an engine is a spark ignited Otto Cycle internal combustion engine. For a high pressure use device, fuel can be delivered from the pressurized tank through a pump to a high pressure system such as a high pressure natural gas fuelled direct injection engine; in such an engine the fuel is typically introduced directly into the combustion chamber late in the compression cycle and ignited by compression ignition, like in a Diesel Cycle internal combustion engine.

FIG. 1 schematically illustrates an intelligent tank pressure control system 10 which has a storage tank 20 for holding a liquefied gas and electronic controller 110 that controls the pressure inside the tank to adjust the vapor pressure to remain within target preset tank vapor pressure values and/or ranges that are set as a function of system operating conditions based on the signal received from pressure sensor 120, which determines a pressure that correlates to the pressure inside the tank. The variable target vapor pressure values and/or ranges are determined as a function of at least two system operating conditions which can include the vapor volume in the storage space; the fluid flow demand by the use device; and a measured temperature parameter that correlates to the temperature of the fluid exiting the heater. Additionally, user and/or geographical based inputs can be used as system operating conditions for predictive determination of the target preset tank vapor pressure values and/or ranges.

When a storage tank for cryogenic liquids is filled, normally a portion of the cryogen space inside the tank is reserved for vapor. Filling the cryogen space completely with liquid can result in a very short holding time before vapor is vented out to relieve the pressure inside the tank. This is because even a small amount of heat leak into the cryogen space would result in liquid expansion and/or vaporization of some of the liquid, and with little or no space left for vapor and liquid to expand into, the vapor pressure inside the tank would quickly rise to a level that opens the pressure relief valve resulting in vapor being vented from the cryogen space. Upper space 22 of the cryogen space of the tank is normally occupied with vapor and is referred to herein as the vapor space even though some tanks may not have any physical separation from the rest of the cryogen space. Liquid normally occupies lower portion 24 of the cryogen space of the tank. Vapor conduit 40 has a first end disposed in vapor space 22 and provides a passage from the vapor space to use device 100. System 10 further comprises liquefied gaseous fluid conduit 30 whose first end is disposed in liquid space 24 and also provides a passage connecting the tank to use device 100.

As mentioned above, heat inevitably leaks into the cryogen space which can cause the pressure inside the tank to rise over a predetermined high threshold pressure value. To ensure that the pressure inside the tank stays within safe high pressure limits according to the storage tanks design parameters (for example, under 300 psi in some exemplary systems) one or more pressure relief valves can be provided in the system through which vapor is vented out to relieve the pressure inside the tank. For this purpose, a pressure relief valve 26 is disposed on vapor conduit 40. It is generally preferred to open the safety valve only in emergency situations and to maintain the pressure inside the tank below a high threshold value (preferably below 250 psi and more preferably below 230 psi) by using the system and method described herein.

In all the exemplary systems shown and described herein, liquefied gaseous fluid conduit 30 passes through a heater before connecting to use device 100. The heater can be a single line heat exchanger 80, 480 as illustrated in exemplary systems shown in FIGS. 1, 2 and 4; or a multi-line heat exchanger 380 as illustrated in the exemplary system shown in FIG. 3. Referring to the exemplary system shown in FIG. 3, both liquefied gaseous fluid conduit 30 and gaseous fluid vapor conduit 40 pass through heater 380 before connecting to use device 100. Alternatively, in exemplary system shown in FIG. 4, liquefied gaseous fluid conduit 30 passes through heater 480 before connecting to use device 100, while vapor conduit 440 by-passes heater 480.

Use device 100 can be any device that uses a vaporized gas stored in liquefied and vapor form. In preferred systems, use device 100 is a natural gas fuelled internal combustion engine. In other systems, use device 100 is a diagnostic device, a medical device, a processing device, an ablative device, a cutting device, or any other device that benefits from the intelligent management of gaseous fluid stored in liquefied and vapor form in thermally insulated storage tanks and benefit from intelligent control of the pressure and in some systems, temperature, of the cryogenic fluid being supplied. In the exemplary systems illustrated, heat transfer fluid 130 used in the heater to vaporize the liquefied gaseous fluid can be a warm coolant which exits from use device 100; for example, heat transfer fluid 130 can be an engine coolant from an internal combustion engine. The vapor and liquid conduits can either fluidly connect to use device 100 through separate paths or can fluidly connect to a common conduit that delivers gaseous fluid to the use device, as illustrated in FIGS. 1-4.

For adjusting the pressure in tank 20, as further described below, actively controllable vapor valve 60 is disposed on vapor conduit 40. Actively controllable vapor valve 60 can be a flow control valve allowing flow in both directions, for example a solenoid actuated valve, whose operation can be controlled by controller 110. The flow control valves shown in the exemplary systems are preferably a type that can be gradually opened or closed, and/or that can be commanded to intermediate open positions between being fully open and closed, to allow greater control over the fluid flow through their respective conduits. Nevertheless, though less preferred, the disclosed system and method can also employ simpler flow control valves that offer less operational adjustability between open and closed positions.

The operation of the system for intelligently controlling the pressure inside the cryogen space defined by tank 20 is explained herein in connection with the system illustrated in FIG. 1. The pressure inside tank 20 is determined by pressure sensor 120, and the pressure measured by pressure sensor 120 is communicated to controller 110. Electronic controller 110 has a program installed therein for determining a target tank vapor pressure and a target tank vapor pressure range based on system operating conditions. For example the program can employ algorithms and/or reference data for target values in look up tables depending on specific parameters. Generally, when the pressure inside the tank is at or below a first determined target tank vapor pressure, controller 110 closes flow control vapor valve 60 on the vapor conduit which in turn allows check valve 70 on the liquid fluid conduit to open and remove only liquid fluid from the tank and deliver it to the use device. The determined values are normally less than a high pressure limit for storage tank 20 by an amount that includes a safety factor as required by the design codes of the jurisdiction where the storage tank will be in service. Cryogenic liquids are normally stored at relatively low pressures and the first determined preset value can be, for example, 125 psi. By removing only liquid from the tank at the rate that corresponds to the fuel flow necessary to the engine according to the different operation modes, the pressure inside the tank is kept relatively steady or slightly reduced. The pressure inside the tank can slightly increase or decrease depending on the mass and heat of the cryogenic liquid removed from the tank and on the leak heat into the tank from external elements. A target tank vapor pressure range can be determined and used by controller 110 to tighten or relax the control of vapor valve 60 depending on the monitored system parameters. For example, in transient system operating modes where a tight control of the tank vapor pressure may be desirable, a small target tank vapor pressure range may be used or just a single target tank vapor pressure value, with no set tank vapor pressure range being used, so that the controller is constantly adjusting the valve opening of vapor valve 60 to maintain the desired target tank vapor pressure. Alternately in constant system operating modes, a more relaxed control of the tank vapor pressure may be acceptable and a larger target tank vapor pressure range may be used.

If the tank is operating at a higher pressure, above a first determined target tank vapor pressure value, but less than a second determined target tank vapor pressure value which describes a target tank vapor pressure range, for example at pressures above 125 psi and below 200 psi, controller 110 keeps actively controllable vapor valve 60 closed and maintains the flow of liquefied gaseous fluid through liquid fluid conduit 30 to use device 100. If the tank is operating at a higher pressure, above a second determined target tank vapor pressure value, which is above the determined target tank vapor pressure range, for example at a pressure above 200 psi, controller 110 sends a signal to actuate vapor valve 60 which opens and in turn closes check valve 70 until the measured tank vapor pressure drops below the first determined target tank vapor pressure value or a newly determined target value based on current or predictive system operating conditions.

In a preferred system, flow control valves 60 and 90 can open or close gradually to better control the pressure inside the tank and to use device 100. When one or both flow control valves 60 and 90 are of the type that alternate only between an open or closed position, the time the two flow control valves stay open determines how much the pressure is reduced. The pressure inside the tank is continuously measured by pressure sensor 120 and the operation of the vapor control valve 60, and optionally vapor control valve 90 is controlled accordingly by controller 110.

Figure 2:
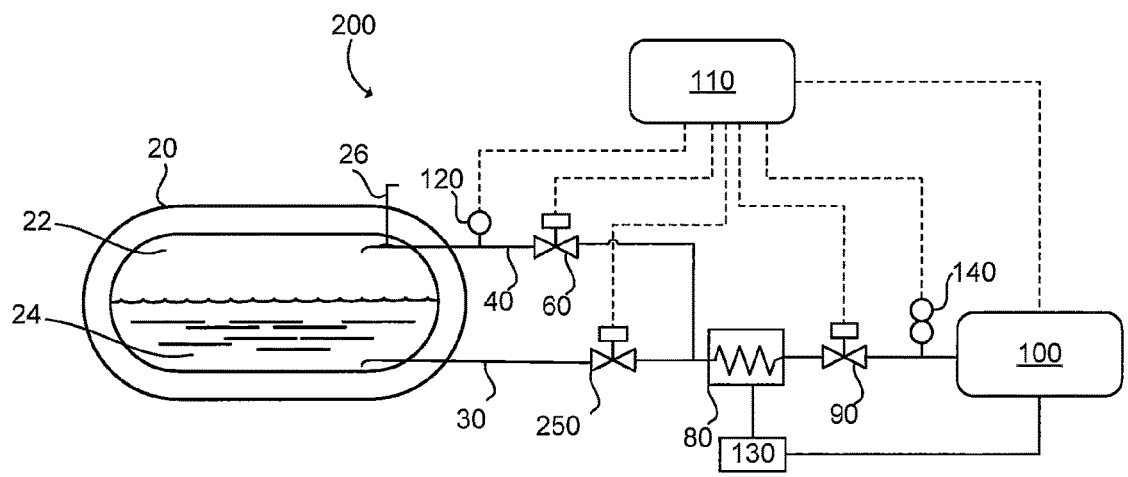
FIG. 2 is a schematic view of a gaseous fluid supply system for a use device having an actively controllable valve disposed on the liquefied gaseous fluid conduit between the storage tank and the heater.

FIG. 2 illustrates another exemplary intelligently controlled variable tank pressure management system 200. The exemplary systems herein have many components that are equivalent to like components of the exemplary system presented in FIG. 1 and like components are identified by like reference numbers. In this disclosure, like-numbered components function in substantially the same way in each exemplary system. Accordingly, if like components have already been described with respect to one exemplary system, while identified in the figures for other exemplary systems, the description of the purpose and function of like components may not be repeated for each of the illustrated exemplary systems. Additionally elements described herein as coupled or connected unless otherwise defined have an effectual relationship realizable by a direct connection or indirectly with one or more other intervening elements.

The operation of the system for intelligently controlling the pressure inside the cryogen space defined by tank 20 will now be explained in connection with the exemplary system illustrated in FIG. 2. The main difference between the first exemplary system shown in FIG. 1 and the variable tank vapor pressure control system illustrated in FIG. 2 is actively controllable valve 250 has replaced manual shut-off valve 50 and check valve 70 on the liquefied gaseous fluid conduit 30. The pressure inside tank 20 is measured by pressure sensor 120 and then it is communicated to controller 110. Electronic controller 110 has a program installed therein for determining a target tank vapor pressure and a target tank vapor pressure range based on system operating conditions. Generally, when the pressure inside the tank is at or below a first determined target tank vapor pressure, (for example 125 psi) controller 110 closes flow control vapor valve 60 on vapor conduit 40 and opens flow control liquid fluid valve 250 on liquid fluid conduit 30 allowing liquid fluid to flow from the tank for delivery to use device 100. By removing only liquid from the tank at the rate that corresponds to the fluid flow necessary for the use device according to different operation modes, the pressure inside the tank is kept relatively steady or slightly reduced. The pressure inside the tank can slightly increase or decrease depending on the mass and heat of the cryogenic liquid removed from the tank and on the leak heat into the tank from external elements. A target tank vapor pressure range can be determined and used by controller 110 to tighten or relax the control of valves 60 and 250 depending on the monitored system parameters. For example, in transient system operating modes where a tight control of the tank vapor pressure may be desirable, a small target tank vapor pressure range may be used or just a single target tank vapor pressure value, with no set tank vapor pressure range being used, so controller 110 is constantly adjusting the valve openings of vapor valve 60 and liquid fluid valve 250 to maintain the desired target tank vapor pressure. Alternately, in constant system operating modes, a more relaxed control of the tank vapor pressure may be acceptable, and a larger target tank vapor pressure range may be used.

If the tank is operating at a higher pressure, above a first determined target tank vapor pressure value, but less than a second determined target tank vapor pressure value which describes a target tank vapor pressure range, for example at pressures above 125 psi and below 200 psi, controller 110 opens both actively controllable valves 60 and 250 on the respective vapor and liquid fluid conduits. Actively controllable valves 60 and 250 are actuated by controller 110 such that more gas is delivered through the liquid conduit when the pressure inside of the cryogen space is closer to the first determined tank vapor pressure value, and more gas is delivered through the vapor conduit when the pressure inside the cryogen space is closer to the second determined tank vapor pressure value. In a preferred system, flow control valves 60 and 250 can open or close gradually so pressure inside the tank can be better controlled. When flow control valves 60, 90 and 250 are of the type that alternate only between an open or closed position, the time the flow control valves stay open determines how much the pressure is reduced. The pressure inside the tank is continuously measured by pressure sensor 120 and the operation of the two flow control valves is controlled accordingly by controller 110.

If tank 20 is operating at excessive pressures above the second determined target tank vapor pressure value, for example above 200 psi, and near the pressure that would trigger the opening of the pressure relief valve 26, which can be around 230 psi, in order to reduce the pressure inside the tank as quickly as possible, controller 110 closes actively controllable valve 250 on the liquid fluid conduit and opens actively controllable vapor valve 60 on the vapor conduit 40 so that only vapor from the vapor space of tank 20 is supplied to use device 100 and the pressure inside tank 20 is quickly reduced. Supplying only vapor to use device 100, such as an engine, might limit the performance for a short period of time due to the pressure drop caused by the reduced density of the fluid supplied to use device 100. This effect can be mitigated by the length of time the flow control valve on the liquid fluid conduit 30 stays closed.

During times when the use device is shut-off and the pressure inside the tank decreases below a set low pressure limit, for example below 70 psi, actively controllable vapor valve 60 on the vapor conduit and actively controllable liquid fluid valve 250 is left open to allow the migration of vapor and liquid out of the tank. The liquid removed from the tank vaporizes because the system components are at ambient temperature. Because there is backpressure in the liquid filled conduit, the vaporized liquid is returned to the tank through the vapor conduit which causes an increase in pressure inside the tank. When enabled, this process is managed carefully to avoid over-pressurizing the tank.

Figure 3:
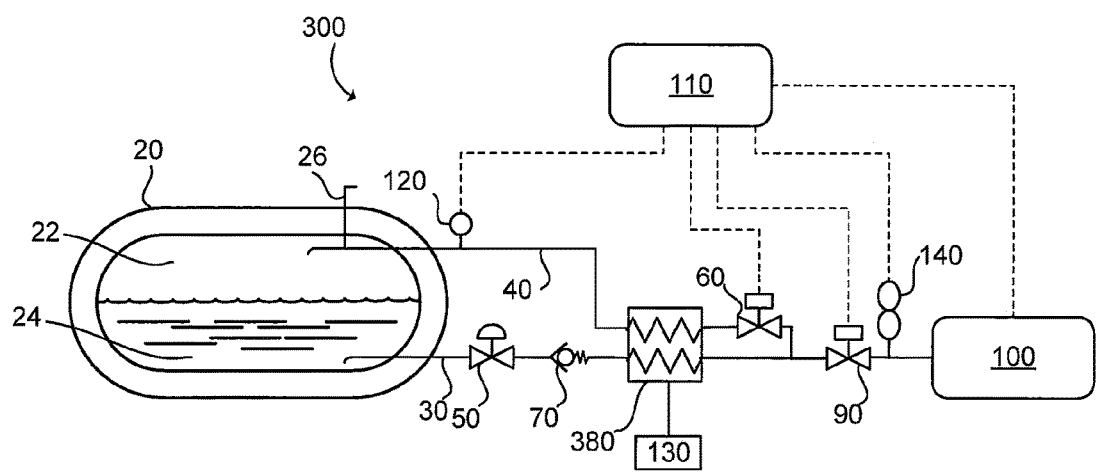

FIG. 3 illustrates another exemplary system of the disclosed intelligently controlled variable tank pressure management system 300. FIG. 3 discloses a multi-line heater 380 for both liquefied gaseous fluid conduit 30 and vapor conduit 40 to pass through. Actively controllable valve 60 is disposed downstream of heater 380 so that warm vapor that leaves the vaporizer passes through the flow control valve and prevents it from freezing.

Figure 4:
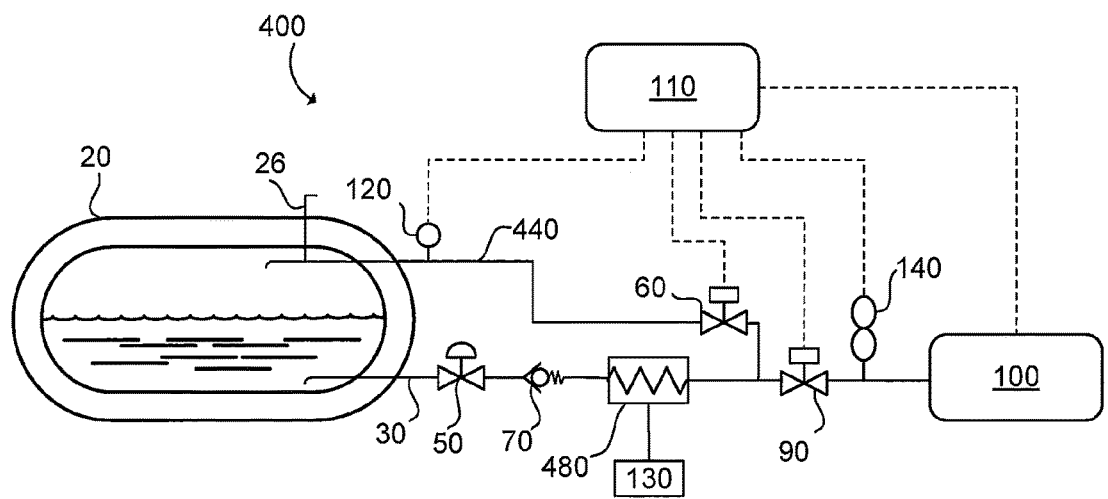
FIG. 4 is a schematic view of a gaseous fluid supply system for a use device having a single line heater through which a liquefied gaseous fluid conduit passes while a vapor conduit by-passes the heater to fluidly connect with the liquid fluid conduit prior to the use device.

FIG. 4 illustrates another exemplary system of the disclosed intelligently controlled variable tank pressure management system 400. FIG. 4 illustrates a single line heater 480 through which liquefied gaseous fluid conduit 30 passes while vapor conduit 440 by-passes the heater, which can be a vaporizer, to fluidly connect with the liquid fluid conduit prior to actively controllable valve 90 and use device 100.

The exemplary systems illustrated in FIGS. 1-4 all include actively controllable valve 90 disposed on the fluid delivery conduit upstream of use device 100 for shutting off flow of fluid to use device 100. The exemplary systems can also include other elements, for example manual shut-off valve 50 (shown in FIGS. 1, 3 and 4) on liquefied gaseous fluid conduit 30 can be used to isolate tank 20, but in normal system operation, it is open to allow liquefied gaseous fluid to flow out from cryogenic tank 20. Accompanying manual shut-off valve 50 is check valve 70 which, as explained, allows liquefied gaseous fluid to flow downstream to the heater/vaporizer, but keeps gaseous fluid from flowing back to tank 20 through liquid conduit 30. When actively controllable vapor valve 60 is actuated to an open position, check valve 70 closes flow to tank 20 along liquid fluid conduit 30.

Additionally, the system can include pressure and temperature sensors 140 at use device 100 for determining the pressure and temperature of fluid delivered to the use device. A temperature sensor (not shown) for determining the heat transfer fluid temperature may also be used as a system operating parameter by controller 110 to determine tank pressure targets and tank pressure target ranges. When use device 100 is an engine, the heat transfer fluid 130 used for the vaporizer can be engine coolant, the temperature of which can be transmitted to controller 110 from an engine controller (not shown) either wirelessly or through a wired harness as is known in the art. In this manner, controller 110 can determine a target tank vapor pressure value and/or a target tank vapor pressure range from a measured heat transfer fluid temperature.

In some systems the composition of the fluid supplied to the use device, respectively the ratio between the vapor and liquid fluids influences the operation of the device. For example, in a spark ignited internal combustion engine higher methane content is preferred when the engine is working at high loads. In such exemplary systems the actively controllable valves can be actuated to slightly vary the ratio content in the fluid delivered to the use device according to its operation while preserving the pressure inside the tank within the predetermined limits. Also, when a vehicle, for example, is idling it is preferred to supply only vapor fuel to its engine, but when the vehicle is operating at full load, a mixture of vapor and liquid fuels is preferred in systems having both an actively controlled vapor valve 60 on vapor conduit 40 and an actively controlled liquid fluid valve 250 on the liquid fluid conduit 30. In such systems, the controller can adjust the opening of the actively controllable valves to ensure delivery of a preferred liquid fuel/vapor fuel ratio to the engine.

The operation of the system for intelligently controlling the pressure inside the cryogen space defined by tank 20 in FIGS. 1-4 will be further explained in a system where the use device is an internal combustion engine system. Specific system operating modes along with exemplary control strategies implemented by the controller are described with respect to the exemplary systems shown in FIGS. 1-4. The determined target tank vapor pressure values and determined target tank vapor pressure ranges are a function of two or more system parameter inputs including liquid fuel level within the cryogenic tank, gas flow demanded by the use device, heat transfer fluid temperature, user inputs, and location based inputs.

Figure 5:
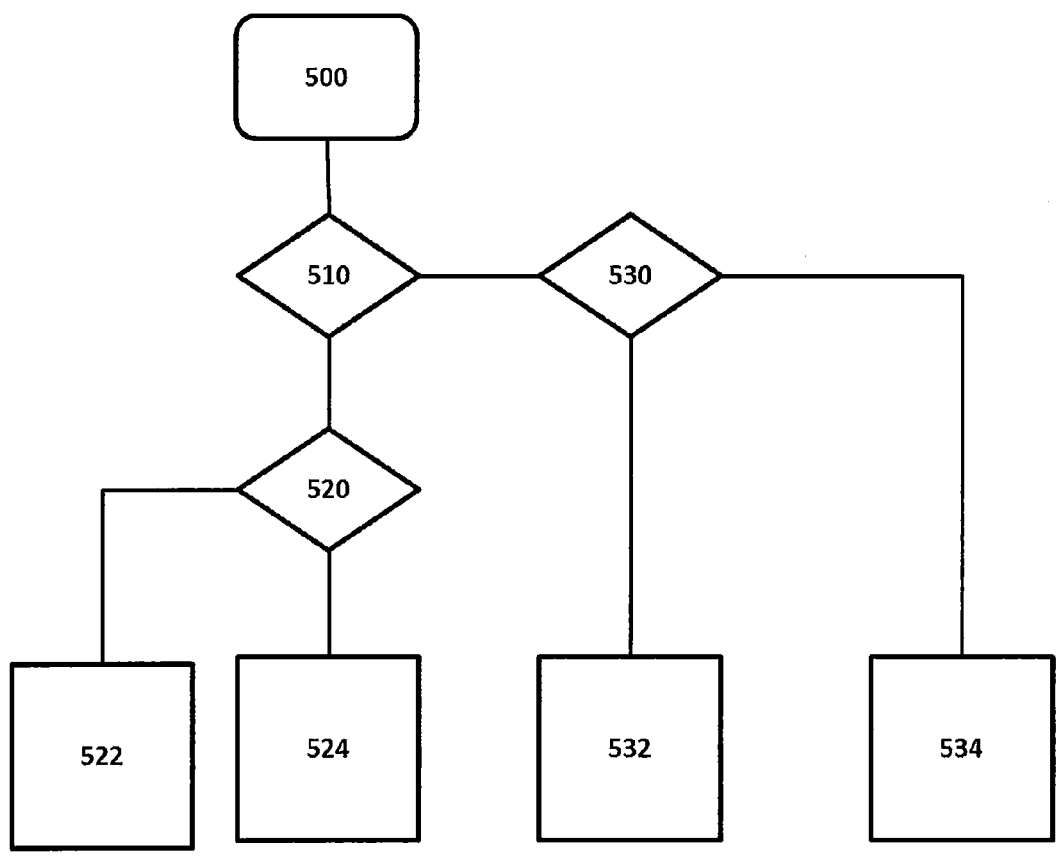
FIG. 5 is a flow chart depicting the steps of a method for managing the vapor pressure between variable pressure range values defined as a function of two system operating conditions, namely the liquid fluid level within the cryogenic tank and the gas flow demand of the use device.

FIG. 5 is a flow chart describing a method for managing the vapor pressure between a targeted tank pressure range as a function of two system operating parameters, namely the liquid fuel level in the cryogenic tank and the gas flow demand of the use device. Starting at step 500, the controller determines if the liquid fuel level in tank 20 is above a predetermined level at step 510, for example a preferred threshold of liquefied fuel being greater than ⅔ full. If yes, the liquid fuel level is higher than the threshold, then the controller proceeds to step 520 where the controller determines if the gas flow demand is above a predetermined threshold, for example at a threshold of 60% max demand. If the controller determines, no, the gas flow demand is not above the predetermined threshold then it will implement command at step 522 which is to open vapor valve 60 and close or cause to close liquid valve 70, 250. If the controller determines, yes, the gas flow demand is above the predetermined threshold then it will implement command at step 524 which is to close vapor valve 60 and open or cause to open liquid valve 70, 250. In the exemplary systems of FIGS. 1, 3 and 4 there is no actively controlled valve like valve 250 in FIG. 2, but because there is a pressure drop across check valve 70 this biases flow through electrically controlled vapor valve 60.

If at step 510, the controller determines, no, the liquid fuel level is not higher than the threshold then the controller proceeds to step 530 where the controller determines if the gas flow demand is above a predetermined threshold, for example at a threshold of 60% max demand. If the controller determines, no, the gas flow demand is not above the predetermined threshold then it will implement command at step 534 which is to open vapor valve 60 if tank vapor pressure is higher than the injection pressure and close or cause to close liquid valve 70, 250. If the controller determines, yes, the gas flow demand is above the predetermined threshold then it will implement command at step 532 which is to close vapor valve 60 and open or cause to open liquid valve 70, 250.

In a gaseous fueled engine system using the system design shown in FIGS. 1-4, there are a number of operating modes where a system operating condition such as the liquid fuel level in the tank can be used to change a target tank vapor pressure which the controller then uses for intelligent control of the vapor pressure in tank 20. In FIGS. 6(*a, b* and *c*) graphical depictions of operating regions are shown as a function of speed (rpm) and load (torque) demand requirements for three different engine operating modes. For simplicity, the following described operation of the actively controlled valves are discussed in terms of a target tank vapor pressure value; however those skilled in the art will understand and can apply the same method taught herein to more than one target tank vapor pressure value as would be the case, for example, when using a relaxed control strategy described earlier herein using target tank vapor pressure ranges.

Figure 6A:
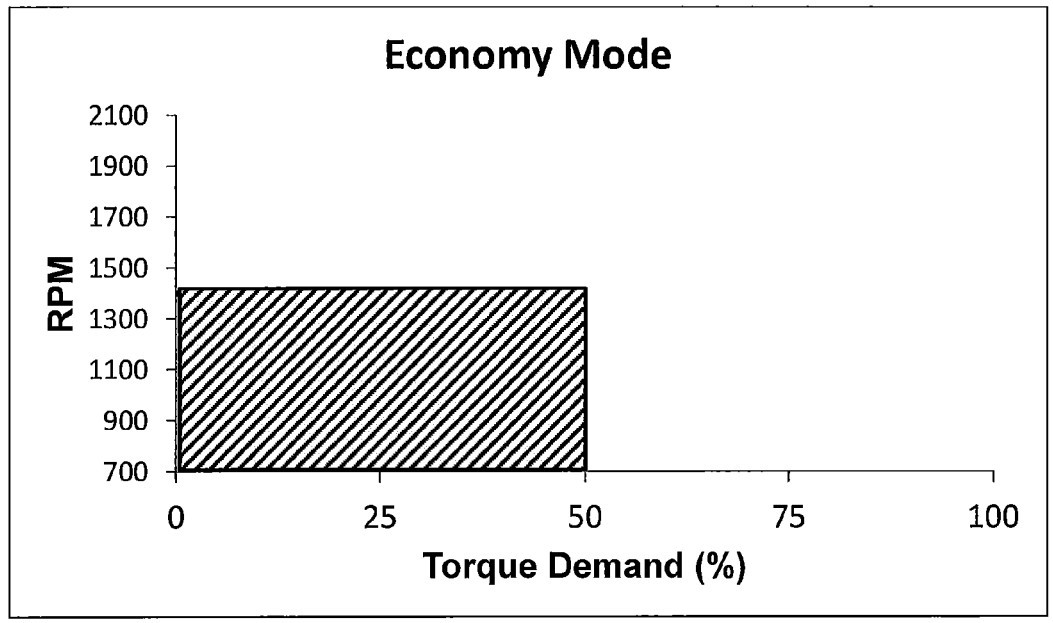
FIGS. 6(a, b, c and d) are graphical illustrations showing regions where exemplary engine operating modes are used to determine controller commands sent to the actively controllable vapor valve (additionally a liquefied gaseous fluid valve in some systems) in order to maintain a desired target tank vapor pressure value or range in a cryogenic fuel tank.

In FIG. 6*a*, the shaded region represents a region on a simplified two dimensional fueling demand map that can be termed as an economy mode operation when the system is operating in the shaded region, and for a determined target tank vapor pressure, of for example 150 psi, may be set. The controller adjusts the pressure in tank 20 by, for example, commanding vapor valve 60 to open (or remain open) when the tank pressure exceeds the target tank vapor pressure of 150 psi to bring the tank pressure under the target tank vapor pressure.

Figure 6B:
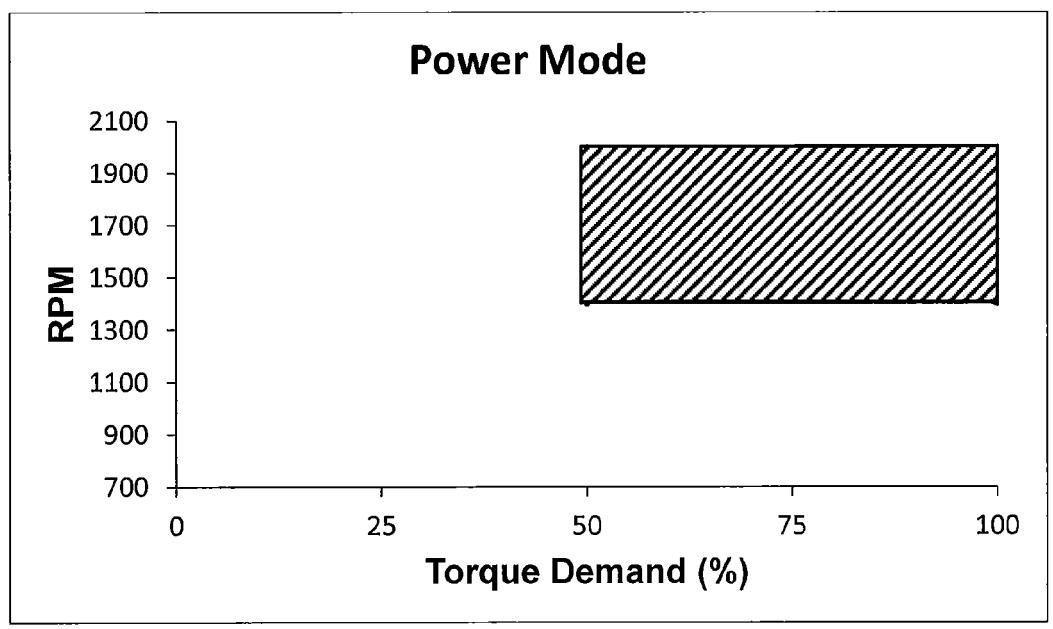

In FIG. 6*b*, the shaded region represents a region on a simplified 2D fueling map that can be termed as a power mode operation. When the system is operating in the shaded region, the target tank vapor pressure may be set as a range with the upper target pressure set to just below the vent threshold pressure of pressure relief valve 26. In this mode, the controller commands vapor valve 60 to close (or remain closed), and opens or causes to open liquid valve 70, 250 (or remain open). A higher vapor pressure helps to push more liquid through liquefied gaseous fluid conduit 30 to better respond to the higher fluid flow rates associated with a high load operating condition.

Figure 6C:
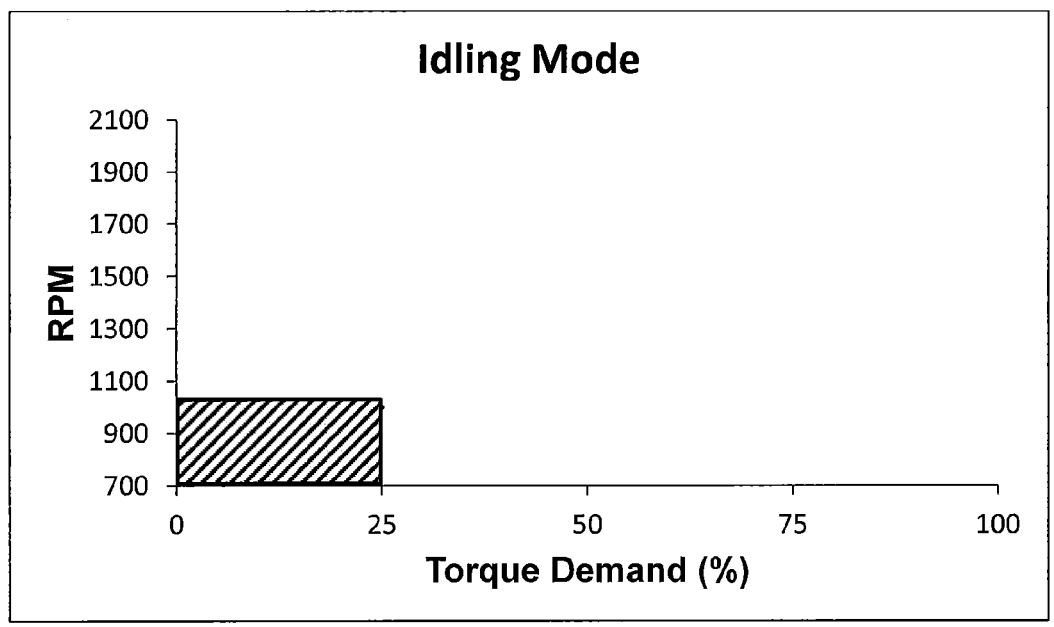

In FIG. 6*c*, the shaded region represents a region on a simplified 2D fueling map that can be termed as an idling mode operation. When the system is operating in the shaded region at low speeds (rpm) and low loads (torque) and for a determined target tank vapor pressure of 150 psi for example, the controller adjusts the pressure in tank 20 by, for example, commanding vapor valve 60 to open (or remain open) and closes or causes to close liquid fluid valve 70, 250 (or remains closed) when the tank pressure exceeds the target tank vapor pressure of 150 psi to bring the tank pressure down to the target tank vapor pressure. When the tank pressure drops below the target tank vapor pressure of 150 psi, the controller commands vapor valve 60 to close and opens or causes to open liquid fluid valve 70, 250 to bring the tank pressure up to the target tank vapor pressure.

Figure 6D:
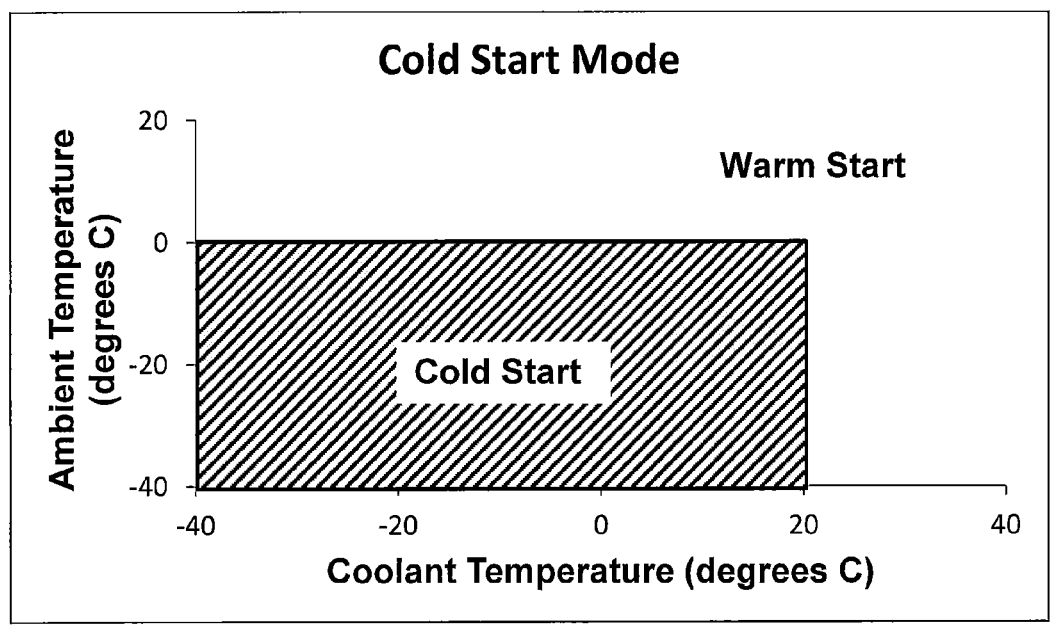

In FIG. 6d, the shaded region represents a cold start mode region where the ambient temperature is below a set value (for example 0 degrees Celsius) and the transfer fluid temperature is below a set value (for example 20 degrees Celsius). This activates a cold start logic mode, and controller 110 commands vapor valve 60 to open or remain open and closes or causes to close liquid fluid valve 70, 250 (or remain closed) until the transfer fluid temperature (shown in FIG. 6d as coolant temperature) is greater than the set temperature value so that the liquid fluid coming out of cryogenic tank 20 does not freeze the heat transfer fluid inside the heat exchanger.

Figure 6E:
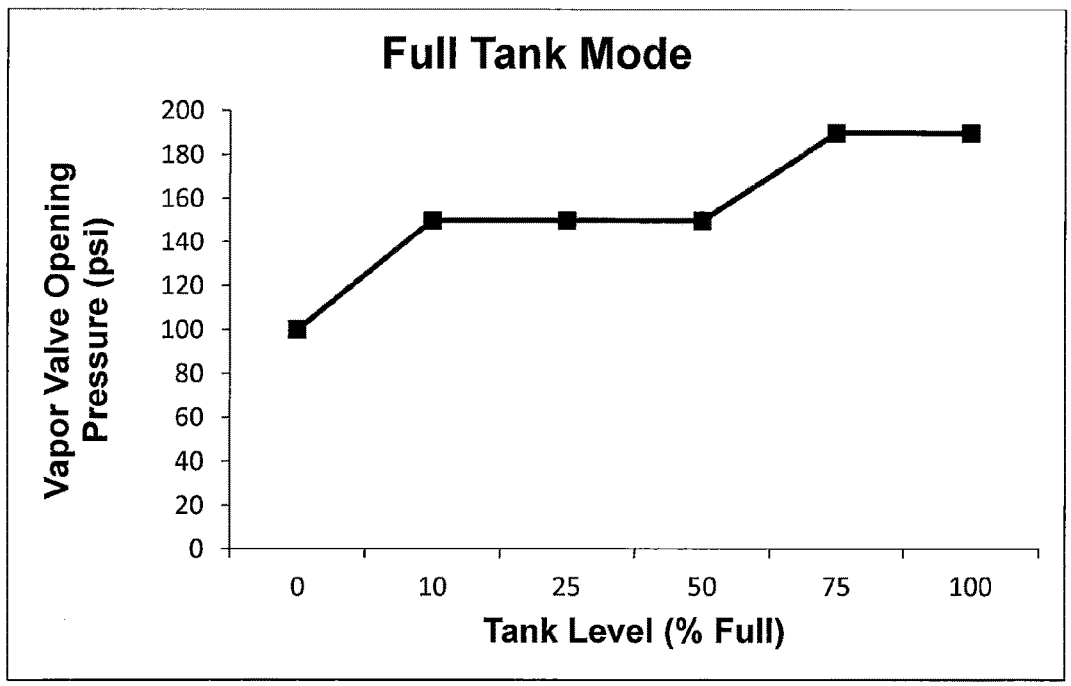
Figure 6F:
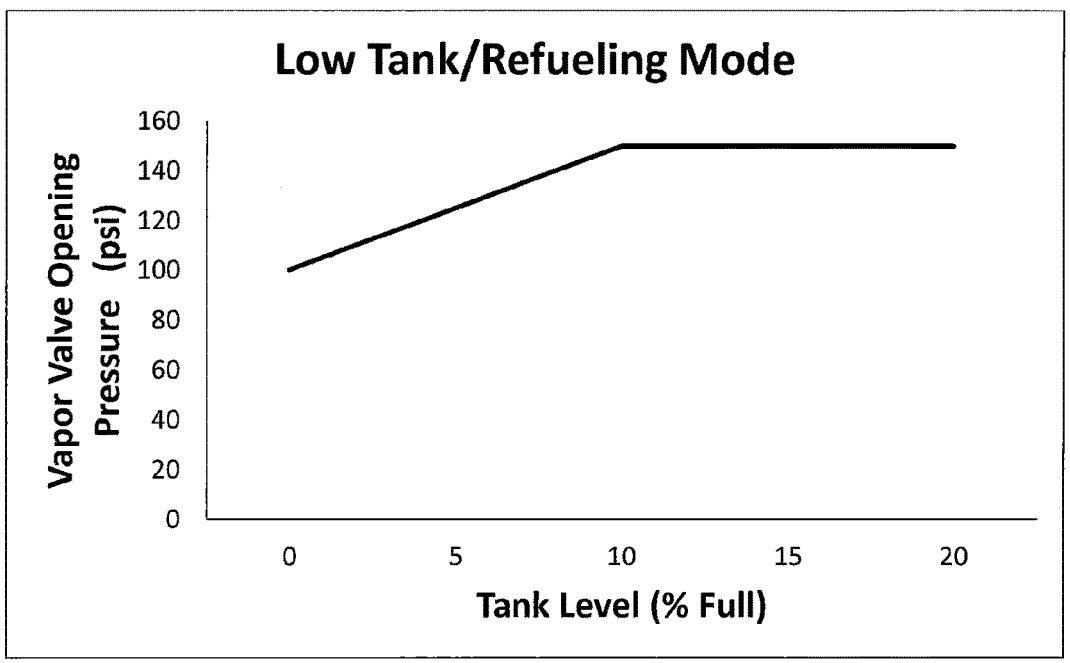

FIGS. 6e and 6f illustrate a graphical depiction of a target tank vapor pressure value as a function of a liquefied fuel tank level. The liquefied fuel tank level can be used to determine and set a target tank vapor pressure for engine operating modes such as an economy mode, a power mode, and an idling mode. In FIG. 6e, the graphical line represents a target tank vapor pressure above which vapor valve 60 is commanded by controller 110 to open or remain open. In a full tank mode, for example after refueling, a higher tank vapor pressure target is used by the controller to allow a higher vapor pressure in the tank after refueling or when the liquid level sensor in the tank indicates the tank is more than half full of liquefied fuel. This is because there is not much tank vapor volume in the tank so when pulling tank vapor, the tank pressure falls quickly. When liquid fuel tank level is between empty and half full there is a lot of vapor volume so tank vapor pressure doesn't fall as quickly and therefore the vapor valve may be in an open position. FIG. 6f shows the lower fuel level region from FIG. 6e and depicts the target tank vapor pressure when the liquid level in tank 20 is low. In this example, when the liquid level of tank 20 is below 10% of tank capacity, target tank vapor pressure drops and controller 110 commands vapor valve 60 to open to draw down the vapor pressure in the tank in preparation for a refueling operation.

In some systems, controller 110 can operate in a predictive mode, based on learned operator or use patterns or user and geographical inputs that would indicate for example imminent refueling (distance and/or time to refuel), imminent return to home base, imminent parking, imminent shut down, and imminent high load mode requirements to name a few examples. When refueling is determined to be imminent, for example, either through a low liquid level measurement, or a user and/or geographical input requesting refueling mode override for example, controller 110 switches into a refueling mode and so vapor is drawn down in tank 20 to a low target vapor pressure value in preparation for refueling. This same procedure can be used when the engine is going to be shut down, the vehicle is going to be parked for an extended period of time, or when system service is recommended. When there is a high load requirement determined to be imminent, for example, either through geographical inputs using location based routing inputs from a Global Positioning System (GPS) unit, a measured incline, a rate change of the engine or vehicle ("pulling a hill"), a measured throttle position and/or rate of throttle position change, controller 110 switches to a high load demand mode where controller 110 maintains a high tank pressure target. The controller commands vapor valve 60 to close or remain closed and liquid fluid valve 70 to open or remain open. In systems having actively controllable liquid fluid valve 250, the controller can command vapor valve 60 to an open position or remain in an open position and command liquid fluid valve 250 to an open position or more open position to maintain a target vapor pressure in tank 20 while increasing the available gas supply to use device 100.

While particular elements, embodiments and applications of the present invention have been shown and described, it will be understood, that the invention is not limited thereto since modifications can be made by those skilled in the art without departing from the scope of the present disclosure, particularly in light of the foregoing teachings. Additionally, while many examples herein have described an intelligent pressure management system for a cryogenic fluid system supplying an internal combustion engine system, the same embodiments and teachings herein can be used for managing the pressure of a gaseous fluid stored in a liquefied state to supply other use devices, including use devices used in the medical, manufacturing, building, energy, testing and diagnostic fields.

I claim:

1. A pressure management system for storing and delivering a fluid to a use device, the fluid being in gaseous form at standard temperature and pressure, but stored in liquefied and vapor form, the system comprising:
    a tank defining a thermally insulated storage space that can be held at a temperature and pressure at which the fluid can be stored in a liquefied and vapor form;
    a first conduit through which the liquefied fluid can be delivered from the thermally insulated storage space to the use device;
    a first fluid valve associated with the first conduit operable to stop or allow fluid flow through the first conduit;
    a heater associated with the first conduit and operable to transfer heat to the liquefied fluid flowing through the first conduit before it is delivered to the use device;
    a second conduit fluidly connecting a vapor space in the thermally insulated storage space with the first conduit;
    a vapor valve associated with the second conduit operable to stop or allow fluid flow through the second conduit;
    a pressure sensor that measures fluid pressure at a point in the system from which pressure inside the thermally insulated storage space can be determined; and
    a controller connected to receive data inputs from the system and the use device and programed to send signals to actuate the vapor valve responsive to a determined pressure inside the thermally insulated storage space to maintain a preset pressure target that is variable as a function of predetermined operating conditions, including at least two of:
    (a) vapor volume in the thermally insulated storage space;
    (b) fluid flow demanded by the use device; and
    (c) a measured temperature parameter that correlates to a temperature of the fluid exiting the heater.

2. The pressure management system of claim 1, wherein the controller is further programed to send signals to actuate the first fluid valve responsive to the determined pressure inside the thermally insulated storage space to maintain the preset pressure target.

3. The pressure management system of claim 1, wherein the vapor valve is operable to stop or allow fluid flow between the tank and the heater.

4. The pressure management system of claim 1, wherein the second conduit fluidly connects to the first conduit downstream of the heater.

5. The pressure management system of claim 1, further comprising a second fluid valve disposed on the first conduit downstream of the heater, wherein the controller is programmed to actuate the second fluid valve to allow or stop fluid flow to the use device.

6. The pressure management system of claim 1, wherein at least one of the vapor valve and the first fluid valve has a variable opening to control flow of fluid from the tank to the use device.

7. The pressure management system of claim 1, wherein the controller operates in a predictive mode to adjust the preset pressure target based on at least one of a learned operator use pattern, a learned system use pattern, a user input, and a geographical location based input.

8. The pressure management system of claim 1, wherein the preset pressure target is lowered at a predetermined distance and/or time to at least one of system refueling, system return to home base, system parking, and system shut down.

9. The pressure management system of claim 1, wherein the preset pressure target is raised at a predetermined distance and/or time to a high load requirement of the use device.

10. The pressure management system of claim 1, wherein the controller is further programed to send signals to actuate the first fluid valve and the vapor valve, each to an open position, responsive to a predetermined distance and/or time to a high load requirement of the use device.

11. A method for controlling pressure inside a cryogen space defined by a storage tank, and delivering fluid from the cryogen space to a use device, the method comprising:
  a) determining a pressure inside the cryogen space;
  b) communicating the measured pressure to an electronic controller;
  c) comparing the determined pressure to a preset target vapor pressure that is variable as a function of predetermined operating conditions, including at least two of vapor volume in the cryogen space; fluid flow demanded by the use device; and a measured temperature parameter that correlates to a temperature of the fluid exiting a heater that raises a temperature of the fluid delivered to the use device; and
  d) actuating a vapor valve responsive to a determined differential between the determined pressure and the preset target vapor pressure to adjust the vapor pressure in the cryogen space to maintain the preset target vapor pressure.

12. The method of claim 11 further comprising at least one of:
  maintaining the vapor valve position when the determined differential between the preset target vapor pressure and the determined pressure is null;
  actuating the vapor valve to an open position or maintaining an open position when the determined differential between the preset target vapor pressure and the determined pressure is a positive differential, in that the determined pressure is greater than the preset target vapor pressure; and
  actuating the vapor valve to a closed position or maintaining a closed position when the determined differential between the preset target vapor pressure and the determined pressure is a negative differential, in that the determined pressure is less than the preset target vapor pressure.

13. The method of claim 11, wherein the preset tank vapor pressure target is a range having an upper and lower value limit.

14. The method of claim 11, wherein the vapor valve has a variable control opening to control flow of vapor there through.

15. The method of claim 11, further comprising actuating a liquid fluid valve responsive to a determined differential between the determined pressure and the preset target vapor pressure to adjust the vapor pressure in the cryogen space to maintain the preset target vapor pressure.

16. The method of claim 15, wherein any one or both the vapor valve and the liquid fluid valve are actuated to adjust pressure inside the tank.

17. The method of claim 11, wherein the predetermined operating conditions include at least one of a learned operator use pattern, a learned system use pattern, a user input, and a geographical location based input.

18. The method of claim 11, further comprising adjusting the preset pressure target based on a predictive operation mode using inputs from at least one of distance to system refueling, time to system refueling, distance to system return to home base, time to system return to home base, distance to system parking, time to system parking, distance to system shut down, time to system shut down, distance to high load requirement, and time to high load requirement.

19. The method of claim 11, further comprising lowering the preset pressure target at a predetermined distance and/or time to at least one of system refueling, system return to home base, system parking, and system shut down.

20. The method of claim 11, further comprising raising the preset pressure target at a predetermined distance and/or time to a high load requirement of the use device.

* * * * *